(12) United States Patent
Cipollini et al.

(10) Patent No.: US 9,362,577 B2
(45) Date of Patent: Jun. 7, 2016

(54) FUEL CELL WATER MANAGEMENT ARRANGEMENT

(75) Inventors: Ned E. Cipollini, East Windsor, CT (US); Robert Mason Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 754 days.

(21) Appl. No.: 13/641,723

(22) PCT Filed: Apr. 19, 2010

(86) PCT No.: PCT/US2010/031568
§ 371 (c)(1),
(2), (4) Date: Oct. 17, 2012

(87) PCT Pub. No.: WO2011/133134
PCT Pub. Date: Oct. 27, 2011

(65) Prior Publication Data
US 2013/0034798 A1    Feb. 7, 2013

(51) Int. Cl.
*H01M 8/02* (2006.01)
*H01M 8/04* (2006.01)
*H01M 4/86* (2006.01)
*H01M 8/10* (2006.01)
*H01M 4/88* (2006.01)

(52) U.S. Cl.
CPC ........ *H01M 8/04171* (2013.01); *H01M 4/8605* (2013.01); *H01M 4/8626* (2013.01); *H01M 4/8647* (2013.01); *H01M 4/8892* (2013.01); *H01M 8/0271* (2013.01); *H01M 8/1002* (2013.01); *Y02E 60/521* (2013.01)

(58) Field of Classification Search
None
See application file for complete search history.

(56) References Cited

U.S. PATENT DOCUMENTS

| 6,783,883 | B1 | 8/2004 | Koschany |
| 2004/0137303 | A1 | 7/2004 | Kuroki et al. |
| 2009/0061271 | A1* | 3/2009 | Sekino ................ H01M 8/0273 429/410 |

FOREIGN PATENT DOCUMENTS

| JP | 2005174908 | 6/2005 |
| JP | 5103905 B | * 12/2012 |
| KR | 20100022503 | 3/2010 |
| WO | WO 2006/109645 | * 10/2006 |

OTHER PUBLICATIONS

International Search Report and Written Opinion for PCT/US2010/031568 dated Jan. 24, 2011.

* cited by examiner

*Primary Examiner* — Jonathan Crepeau
(74) *Attorney, Agent, or Firm* — Seed IP Law Group PLLC

(57) ABSTRACT

An example fuel cell device includes an electrode assembly having two gas diffusion layers (GDLs). One GDL is adjacent to the anode electrode and the other GDL is adjacent to the cathode electrode. Seals on the periphery of the GDLs are configured to block reactant gases from direct mixing within the GDLs. Sealing the perimeter of the GDLs blocks liquid-water flow from exiting the gas diffusion layer. The disclosed example provides an opening in the seal near a fluid exit area of the fuel cell that provides a path for communicating water from the active area through a perimeter portion of the GDL. An example method of managing fluid in a fuel cell includes providing an opening in a perimeter seal of a GDL of the fuel cell. The method communicates a fluid through a channel in the plate and moves water through the opening using the fluid.

19 Claims, 2 Drawing Sheets

FUEL CELL WATER MANAGEMENT ARRANGEMENT

CROSS-REFERENCE TO RELATED APPLICATIONS

This application is the U.S. national phase of PCT/US2010/031568, filed

TECHNICAL FIELD

This disclosure relates generally to fuel cells. In particular, this disclosure relates to removing water from a gas diffusion layer of the fuel cell.

DESCRIPTION OF RELATED ART

Fuel cell assemblies and power plants are well known. One example fuel cell assembly includes multiple individual fuel cells arranged in a stack. Each individual fuel cell has an anode and a cathode positioned on either side of proton exchange membrane. A fuel, such as hydrogen, is supplied to an electrode on the anode side of the proton exchange membrane. An oxidant, such as air, is supplied to another electrode on the cathode side of the proton exchange membrane. The fuel is fluid and moves through channels in a plate to the anode side of the proton exchange membrane. The oxidant is fluid and moves to the cathode side of the proton exchange membrane through channels in another plate. Gas diffusion layers (GDLs) are located between respective channels and electrodes. The GDLs help distribute the fuel and the oxidant from the channels to the respective electrode layers. The perimeters of the gas diffusion layers include seals to prevent reactants from mixing in the GDLs and leaking into their opposite manifolds, for example.

As known, electrochemical reactions within the fuel cell produce water. Although some water is typically required to facilitate the chemical reactions, excessive water accumulation can flood or otherwise damage the fuel cell. For example, water can freeze and block the path of the oxidant to the catalyst surface. Managing the produced water to avoid excessive water accumulation within the fuel cell enhances fuel cell performance and durability.

SUMMARY

An example fuel cell device includes an electrode assembly having two gas diffusion layers (GDLs). One GDL is adjacent to the anode electrode and the other GDL is adjacent to the cathode electrode. Seals on the periphery of the GDLs are configured to block reactant gases from direct mixing within the GDLs. Sealing the perimeter of the GDLs blocks liquid-water flow from exiting the gas diffusion layer. The disclosed example provides an opening in the seal near a fluid exit area of the fuel cell that provides a path for communicating water from the active area through a perimeter portion of the gas diffusion layer.

An example fuel cell device seal includes a seal configured to block flow of fluid through a perimeter portion of a gas diffusion layer in a fuel cell. The seal establishes an opening near a fluid outlet in a plate of the fuel cell. The opening establishes a path for communicating water through the perimeter portion of the gas diffusion layer away from the active area of the fuel cell.

An example method of managing fluid in a fuel cell includes providing an opening in a perimeter seal of a gas diffusion layer of the fuel cell. The method communicates a fluid through a channel in a fuel cell plate and moves water through the opening using the fluid.

These and other features of the disclosed examples can be best understood from the following specification and drawings. The following is a brief description of the drawings.

DETAILED DESCRIPTION

Figure 1:
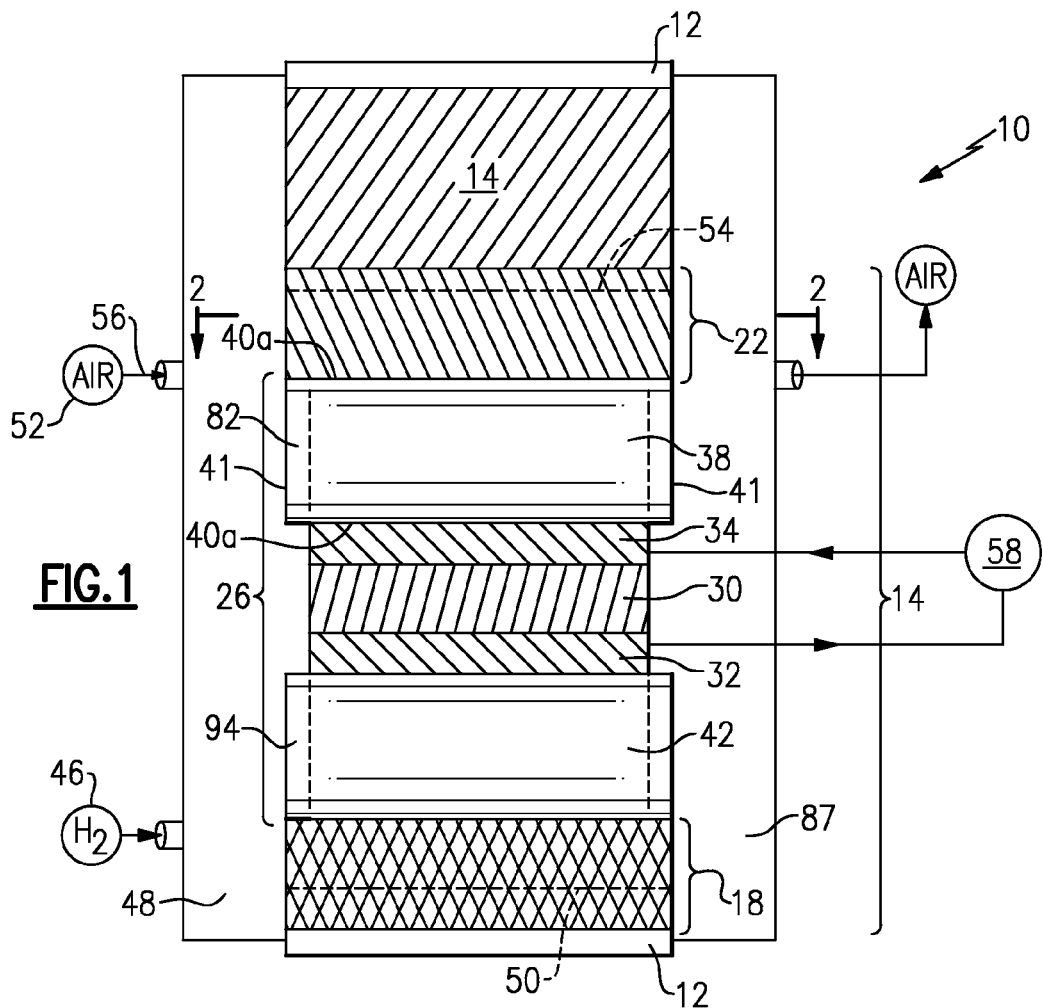
FIG. 1 is a schematic view of an example fuel cell.

Referring to FIG. 1, an example proton exchange membrane fuel cell 10 includes pressure plates 12 configured to hold together multiple individual cells 14 arranged in a stack. Each cell 14 includes an anode plate 18 and a cathode plate 22 on opposing sides of a unitized electrode assembly 26. The unitized electrode assembly 26 includes a proton exchange membrane 30 positioned between electrodes 32 and 34.

A cathode side gas diffusion layer (GDL) 38 is arranged between the cathode plate 22 and the proton exchange membrane 30. An anode side gas diffusion layer (GDL) 42 is arranged between the anode plate 18 and the proton exchange membrane 30. A fuel source 46 supplies fuel, such as hydrogen, to a fuel channel 50 or flow field within the anode plate 18. A fuel manifold 48 distributes fuel to the fuel channel 50 in this example. The gas diffusion layer 42 then distributes hydrogen from the fuel channel 50 to the anode electrode 32.

An oxidant source 52 supplies an oxidant 56, such as air, through an air inlet manifold 57 to an oxidant channel 54 or flow field within the cathode plate 22. The gas diffusion layer 38 distributes the oxidant from the oxidant channel 54 to the cathode electrode 34. The gas diffusion layers 38 and 42 distribute oxidant and fuel to the electrodes 32 and 34.

The GDLs 38 and 42 may contain a microporous layer in addition to the macroporous layer shown in the figures. Macroporous and microporous layers are different in their pore sizes and hydrophobicity. Macroporous layers usually have a narrow pore-size distribution centered between 20 and 50 microns and may be hydrophobic, hydrophilic, or untreated carbon. Examples of macroporous layers are generic carbon paper, Toray 60, or SGL 20AA. Microporous layers typically have pore-size distributions with pores between 0.05 and 5 microns and are almost always hydrophobic. Example microporous layers include mixtures of Vulcan carbon and Teflon.

In this example, hydrogen fuel reacts on the anode electrode 32 to form protons and free electrons. Oxygen in the air, protons and free electrons react at the cathode electrode 34 and form water. The free electrons from the separated hydrogen molecules are used to power a load 58. The protons pass across the proton exchange membrane 30 and react with the oxygen in the reactant and the free electrons returning from the load 58 to form water and produce heat.

Figure 2:
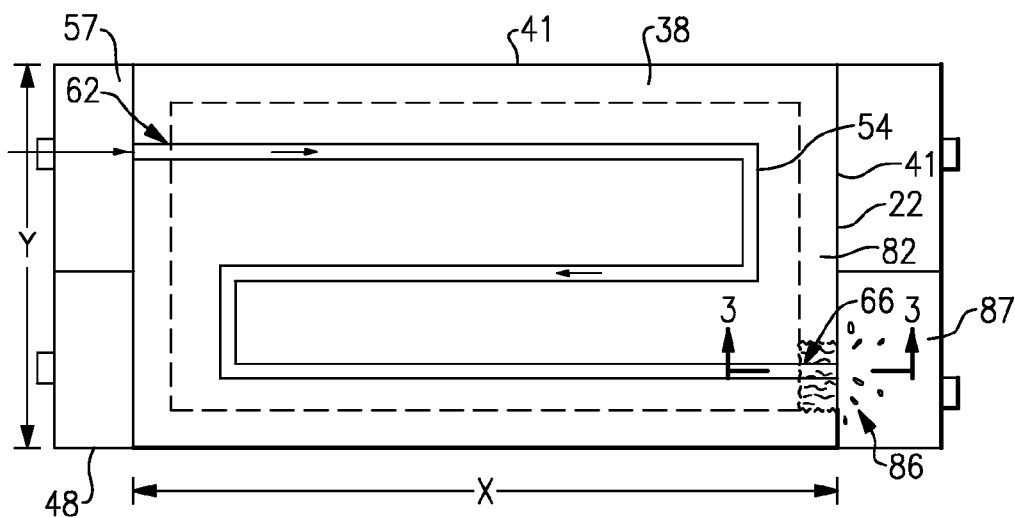
FIG. 2 is a section view at line 2-2 of FIG. 1.
Figure 3:
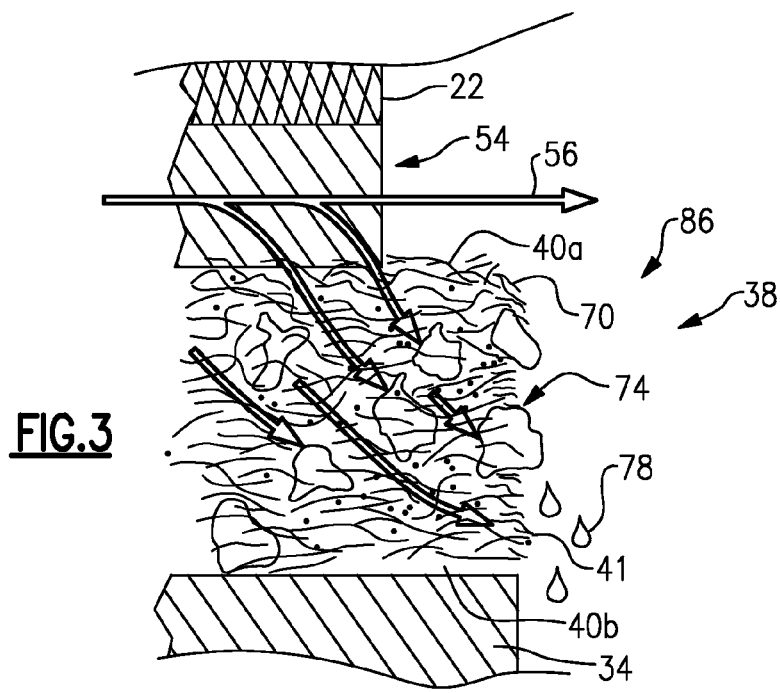
FIG. 3 is a section view at line 3-3 of FIG. 2.

Referring to FIGS. 2 and 3 with continuing reference to FIG. 1, an example oxidant channel 54 has a three pass configuration and extends between an oxidant inlet 62 and an oxidant outlet 66. A compressor or blower pump (not shown) forces the oxidant 56 through the oxidant channel 54, for example.

The example gas diffusion layer 38 includes multiple carbon fibers 70. Pores 74 between the fibers 70 hold water 78 generated during operation of the fuel cell 14 in isolated pockets. The water 78 held in the isolated pockets blocks oxygen transport to the cathode electrode 34. The gas diffusion layer 38 includes SGL 20AA or Toray 60 in some examples.

The example gas diffusion layer 38 is about 15 cm in the Y dimension and 30 cm long in the X dimension. 5. The gas diffusion layer 38 has two opposite facing surfaces 40a and 40b. A plurality of sides 41 extend between the two surfaces 40a and 40b. Four sides 41 extend between the two surfaces 40a and 40b in this example. The oppositely facing surface 40a contacts the cathode plate 22. The surface 40b contacts the cathode electrode 34 of the unitized electrode assembly 26, or the microporous layer (not shown).

In this example, some of the perimeter portion of the cathode gas diffusion layer 38 includes a seal 82. The example seal 82 extends laterally to the edge of the active area defined by the cathode plate 22, but could also extend past the cathode plate 22. The seal 82 blocks the flow of oxidant 56 through the perimeter portion of the cathode gas diffusion layer 38.

The anode gas diffusion layer 42 also includes a seal 94 that blocks flow of fuel from the fuel source 46 from moving through selected areas of the gas diffusion layer 42. The seal 94 extends to the end of the anode plate 18, but could extend laterally past the anode plate 18.

One example method for creating the seals 82 and 94 is impregnating the perimeter portion of the gas diffusion layer 28 with a sealing material, such as KYNAR®. In another example, strips of polyethylene placed on top of the gas diffusion layer 28 are melted and flow into the pores 74 where they harden to provide the seal 82. In a yet another example, the pores 74 in the seal volume represented by 82 and 94 are substantially filled with a liquid polymer resin, such as SYLGARD® 170 which is cured in place.

The example seal 82 establishes an opening 86 near the oxidant outlet 66. The opening 86 is a perimeter area of the gas diffusion layer 28 that does not include the seal 82. In this example, without the seal 82, water 78 is free to move through the opening 86 near the air exit 76. Oxidant 52 is also free to move through the opening 86 to an air exit manifold 87.

The example opening 86 extends across the height of the gas diffusion later 38 from the surface 40a to the surface 40b. In another example, the opening 86 extends across less than the height.

The surface 40a of the gas diffusion layer 28 facing the cathode plate 22 is irregular due in part to the transitions between the fibers 70 and pores 74. As the oxidant 56 moves through the oxidant channel 54 across the surface 40a, some of the oxidant 56 flows through the pores 74. The irregularities in the surface 40a facilitate subducting a fraction of the oxidant 56 into the pores 74 between the fibers 70. Notably, the oxidant 56 would have a more laminar flow if not for the irregularities in the surface 40a. Moving oxidant 56 through the pores 74 toward the opening 86 establishes a pressure gradient enabling movement of the water 78 from the pores 74 of the gas diffusion layer 28 through the opening 86.

As can be appreciated, increasing the size of the opening 86 would allow the oxidant 56 to move more water 78 from the gas diffusion layer 28, and decreasing the size of the opening 86 restricts the ability of the oxidant 56 to move water 78 from the gas diffusion layer 28. Accordingly, a user can adjust the size of the opening 86 to effectively manage the water 78 within the fuel cell 14.

Other examples use a fluid other than the oxidant 56 to move water 78. For example, fuel moving through the fuel channel 50 of the anode plate 18 could be used to move water from the gas diffusion layer 42. In such an example, the seal 94 extending along a perimeter portion of the gas diffusion layer 42 establishes an opening near the fuel's outlet from the fuel cell 14.

Figure 4:
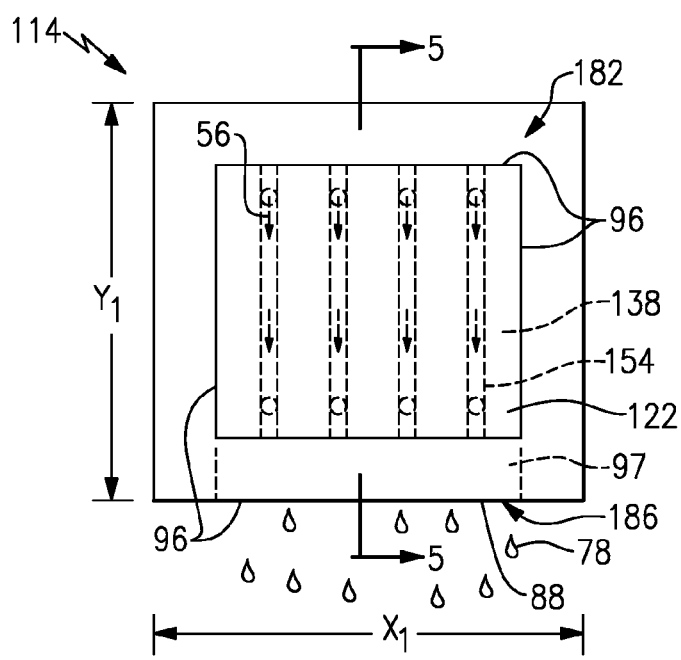
FIG. 4 is schematic view of a portion of another example fuel cell.
Figure 5:
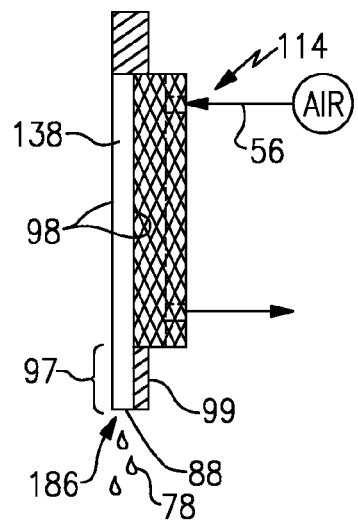
FIG. 5 is a section view at line 5-5 of FIG. 4.

FIGS. 4 and 5 show top and side views, respectively, of another example of a fuel-cell design typical of a subscale fuel cell 114. In this example, oxidant 56 is supplied perpendicular to the cathode plate 122, moves across a gas diffusion layer 138 of the subscale fuel cell 114 through oxidant channels 154 in a plate 122. The gas diffusion layer 138 includes four sides 96 extending between two oppositely facing surfaces 98. A seal 182, typically a Teflon® gasket, covers three of sides 96, and the remaining side is not sealed. The thickness of seal 182 is equal to the sum of thicknesses of gas diffusion layer 138 and Teflon shim 99. The remaining side includes an exposed surface 88 that is not covered by the seal. The exposed surface 88 provides an opening 186 for moving water 78 from the gas diffusion layer 138.

The fuel cell 144 in this example is about 7.5 cm in the $Y_1$ dimension and about 7.5 cm in the $X_1$ dimension. As can be appreciated from the Figures, the gas diffusion layer 138 includes an extended portion 97 that extends past the plate 122 in the direction of the opening 186. The extended portion 97 terminates laterally at the exposed surface 88.

The example seal 182 is a Teflon seal. A shim 99 of the Teflon seal covers a top surface of the extended portion 97 facing the plate 122.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Although a preferred embodiment has been disclosed, a worker of ordinary skill in this art would recognize that certain modifications would come within the scope of this invention. For that reason, the following claims should be studied to determine the true scope and content of this invention.

We claim:

1. A fuel cell device, comprising:
an electrode assembly having a gas diffusion layer;
a seal that blocks water flow from a perimeter portion of the gas diffusion layer, the seal having an opening near a fluid exit area of the fuel cell device that provides a path for communicating water from the perimeter portion of the gas diffusion layer; and
a plate adjacent the gas diffusion layer, the plate establishing a channel configured to communicate fluid across the gas diffusion layer between a fluid inlet area and the fluid exit area.

2. The fuel cell device of claim 1, wherein the gas diffusion layer includes pores near the fluid exit area, the pores configured such that at least some of the fluid is able to move from the channel into pores of the gas diffusion layer to urge water through the opening.

3. The fuel cell device of claim 1, wherein the opening provides an unsealed path to communicate water away from the perimeter of the gas diffusion layer.

4. The fuel cell device of claim 1, wherein the gas diffusion layer has two opposite facing surfaces and a plurality of sides that extend between the two surfaces.

5. The fuel cell device of claim 4, wherein the opening extends between the two oppositely facing surfaces.

6. The fuel cell device of claim 4, wherein one of the oppositely facing surfaces contacts a cathode plate.

7. A fuel cell device, comprising:
an electrode assembly having a gas diffusion layer; and a seal that blocks water flow from a perimeter portion of the gas diffusion layer, the seal having an opening near a fluid exit area of the fuel cell device that provides a path for communicating water from the perimeter portion of the gas diffusion layer, wherein the seal is an impregnated portion of the gas diffusion layer.

8. The fuel cell device of claim 1, wherein the gas is supplied perpendicular to the gas diffusion layer.

9. The fuel cell device of claim 1, wherein the gas diffusion layer has a first surface facing a catalyst layer of the electrode assembly, a second, oppositely facing surface, and a plurality of side surfaces extending between the first surface and the second surface, the opening extending across one of the plurality of side surfaces.

10. The fuel cell device of claim 1, wherein the seal blocks gas flow from a perimeter portion of the gas diffusion layer.

11. A fuel cell device seal, comprising:
a seal configured to block flow of fluid through a perimeter portion of a gas diffusion layer in a fuel cell, the seal establishing an opening near a fluid outlet in a plate of the fuel cell, the opening establishing a path for communicating water through the perimeter portion of the gas diffusion layer away from the fuel cell.

12. A method of managing fluid in a fuel cell including a plate and a gas diffusion layer associated with an electrode assembly, the method comprising:
(a) providing an opening in a perimeter seal of the gas diffusion layer;
(b) communicating a fluid through a channel in the plate; and
(c) moving water through the opening using the fluid.

13. The method of claim 12, including communicating fluid within the fuel cell through the channel from a fluid inlet area to a fluid exit area, wherein the opening is near the fluid exit area.

14. The method of claim 12, wherein the reactant gas is supplied perpendicular to the gas diffusion layer.

15. The method of claim 12, wherein the water is held in pores of the gas diffusion layer.

16. The method of claim 12, including impregnating the gas diffusion layer to provide the seal.

17. The method of claim 12, wherein subducted fuel flow moves the water through the opening.

18. The method of claim 12, wherein the fluid is air.

19. The method of claim 12, wherein the fluid contains oxygen or hydrogen.

* * * * *